United States Patent
Serkh

(10) Patent No.: US 7,033,293 B2
(45) Date of Patent: Apr. 25, 2006

(54) EXPANDABLE PULLEY

(75) Inventor: Alexander Serkh, Troy, MI (US)

(73) Assignee: The Gates Corporation, Denver, CO (US)

( * ) Notice: Subject to any disclaimer, the term of this patent is extended or adjusted under 35 U.S.C. 154(b) by 111 days.

(21) Appl. No.: 10/226,910

(22) Filed: Aug. 22, 2002

(65) Prior Publication Data

US 2004/0038763 A1    Feb. 26, 2004

(51) Int. Cl.
F16H 9/10    (2006.01)
(52) U.S. Cl. ........................................... 474/54
(58) Field of Classification Search ................. 474/54, 474/83, 100, 47, 48; D8/360
See application file for complete search history.

(56) References Cited

U.S. PATENT DOCUMENTS

| | | | |
|---|---|---|---|
| 3,956,944 A | 5/1976 | Tompkins | 74/244 |
| 3,994,180 A | 11/1976 | Ackerman | 74/217 |
| 4,325,702 A | 4/1982 | Jacobsson et al. | 474/56 |
| 4,373,926 A | 2/1983 | Fullerton | 474/57 |
| 4,608,034 A | 8/1986 | Reswick | 474/49 |
| 4,705,492 A | 11/1987 | Hattori et al. | 474/49 |
| 4,832,660 A | 5/1989 | Leonard | 474/49 |
| 4,898,567 A | 2/1990 | Tatara et al. | 474/174 |
| 5,254,043 A | 10/1993 | Ling | 474/69 |
| 6,379,275 B1 | 4/2002 | Serkh | 474/49 |

FOREIGN PATENT DOCUMENTS

| | | | | |
|---|---|---|---|---|
| DE | 4320275 A1 | * | 6/1994 | |
| EP | 0309427 B1 | | 7/1991 | |
| FR | 348132 A | * | 1/1905 | 74/54 |
| JP | 63145860 A | | 6/1988 | |

* cited by examiner

Primary Examiner—Vicky A. Johnson
(74) Attorney, Agent, or Firm—J. A. Thurnau, Esq.; C. H. Castleman, Esq.; J. I. Mahurin, Esq.

(57) ABSTRACT

An expandable pulley. The expandable pulley comprises a plurality of belt blocks arranged about an axis of rotation. Each belt block bears upon a radial surface extending normally to the axis of rotation. Another surface of each belt block bears upon a conical member surface which is moveable coaxially with the axis of rotation. A spring bears upon the conical member which urges the conical member in an axial direction, which in turn urges the belt blocks radially outward to compensate for a belt length change and to maintain a belt tension. An elastic member holds the belt blocks in contact with the conical member.

6 Claims, 5 Drawing Sheets

EXPANDABLE PULLEY

FIELD OF THE INVENTION

The invention relates to a pulley, and more particularly to an expandable pulley.

BACKGROUND OF THE INVENTION

A continuously variable transmission pulley is known from U.S. Pat. No. 6,379,275 B1 (2002) to Serkh which discloses a pulley having sheaves with belt blocks arranged circumferentially about a sheave centerline.

Also representative of the art is U.S. Pat. No. 4,705,492 (1987) to Hattori et al. which discloses a pulley having a plurality of drive blocks arranged between pulley surfaces.

The prior art pulleys rely upon coaxial sheaves that are axially moveable relative to one another. Such movement requires mechanisms and equipment separate from and in addition to the pulley. This adds complexity and expense.

What is needed is an expandable pulley that has an automatically expandable belt bearing surface. What is needed is an expandable pulley having a belt bearing surface expandable by a biasing member force applied axially to a conical member. The present invention meets these needs.

SUMMARY OF THE INVENTION

The primary aspect of the invention is to provide an automatically expandable pulley that has an expandable belt bearing surface.

Another aspect of the invention is to provide an expandable pulley having a belt bearing surface expandable by a biasing member force applied axially to a conical member.

Other aspects of the invention will be pointed out or made obvious by the following description of the invention and the accompanying drawings.

The invention comprises an expandable pulley. The expandable pulley comprises a plurality of belt blocks arranged about an axis of rotation. Each belt block bears upon a radial surface extending normally to the axis of rotation. Another surface of each belt block bears upon a conical member surface which is moveable coaxially with the axis of rotation. A spring bears upon the conical member which urges the conical member in an axial direction, which in turn urges the belt blocks radially outward to compensate for a belt length change and to maintain a belt tension. An elastic member holds the belt blocks in contact with the conical member.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
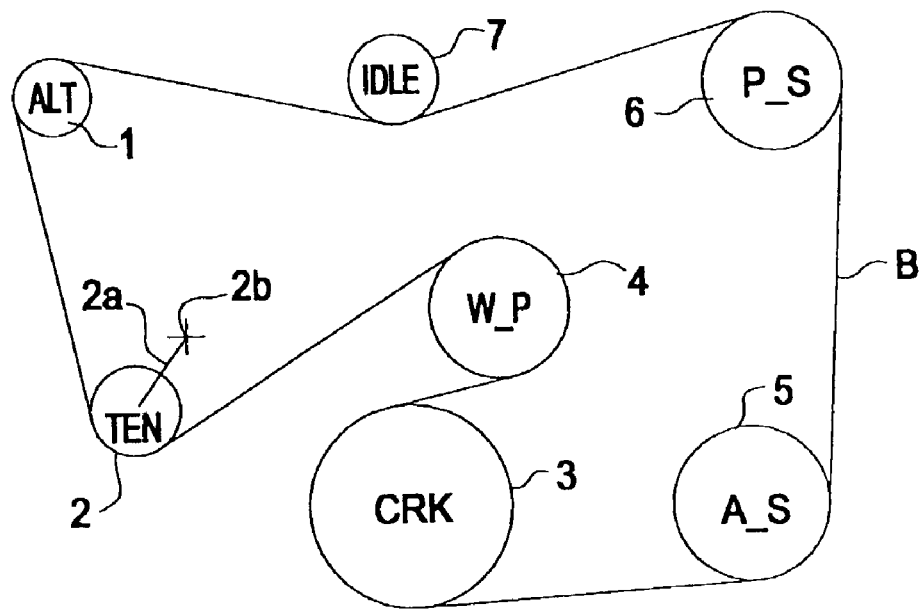
FIG. 1 is a diagram of a prior art belt drive system.

FIG. 1 is a diagram of a prior art belt drive system. In an exemplary belt drive system a number of pulleys are connected by a belt B. A pulley is attached to a driven shaft on various accessories, including an alternator 1, water pump 4, air compressor 5 for air conditioning, and power steering 6.

Idler 7 is used to control belt wrap about pulleys 1 and 6. Tensioner 2 is used to tension belt B. Tensioner 2 comprises arm 2a that pivots about a point 2b. Pulley 2 is journaled to arm 2a. A belt tension is adjusted or compensated by movement of arm 2a. One can appreciate that movement of arm 2a requires space in the prior art system in addition to the volume occupied by the tensioner proper.

Figure 2:
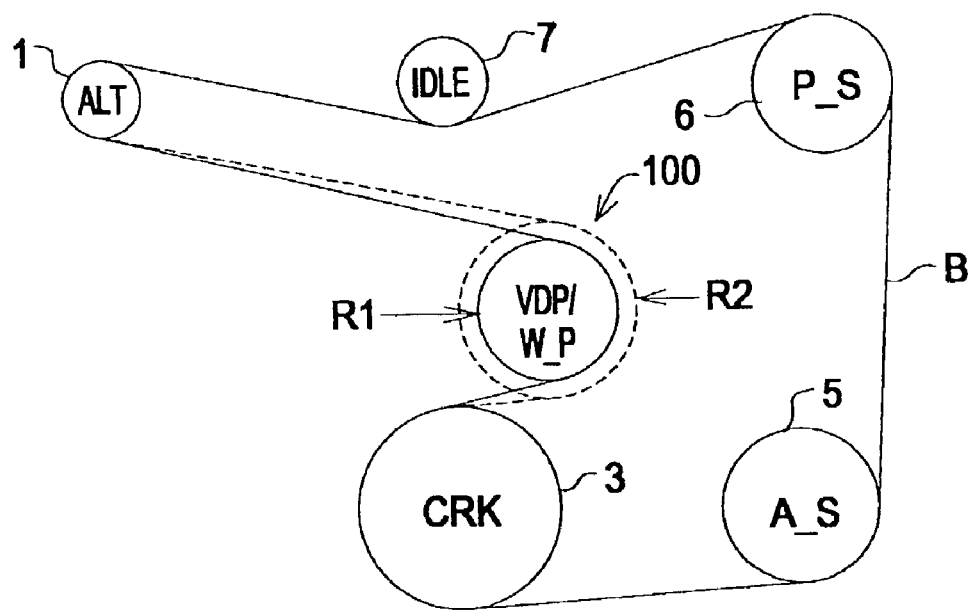
FIG. 2 is a diagram of a belt drive system with an inventive pulley.
Figure 5:
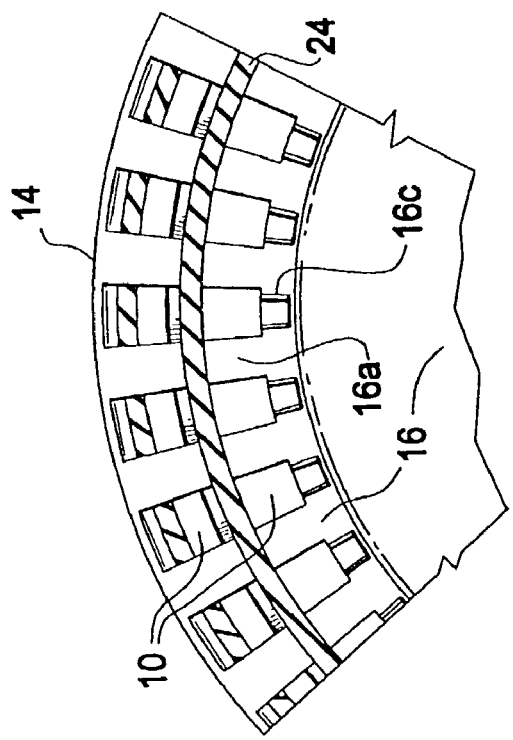
FIG. 5 is a cross-sectional view at line 5—5 in FIG. 3.

FIG. 2 is a diagram of a belt drive system with an inventive pulley. Inventive pulley 100 is shown in the belt drive system. Pulley 100 is attached to a water pump (W_P) driven shaft. The particular pulley embodiment used on the water pump shaft is depicted in FIG. 3 and FIG. 5.

During initial operation, for example when the belt is new, the pulley operates with a radius R1. As the system operates, the belt may lengthen slightly. As the belt changes length, the pulley diameter expands to accommodate the change in belt length. Consequently, the operating radius of the pulley is expandable from R1 to R2. The change in operating radius of the pulley is automatic requiring no outside mechanism or equipment. Further, unlike the prior art, the belt length adjustment function is accomplished in a space defined solely by the overall diameter and volume of the pulley, as opposed to the prior art tensioner which requires space for the arm, as well as space for the arm to move in a partial arc to tension the belt.

Figure 3:
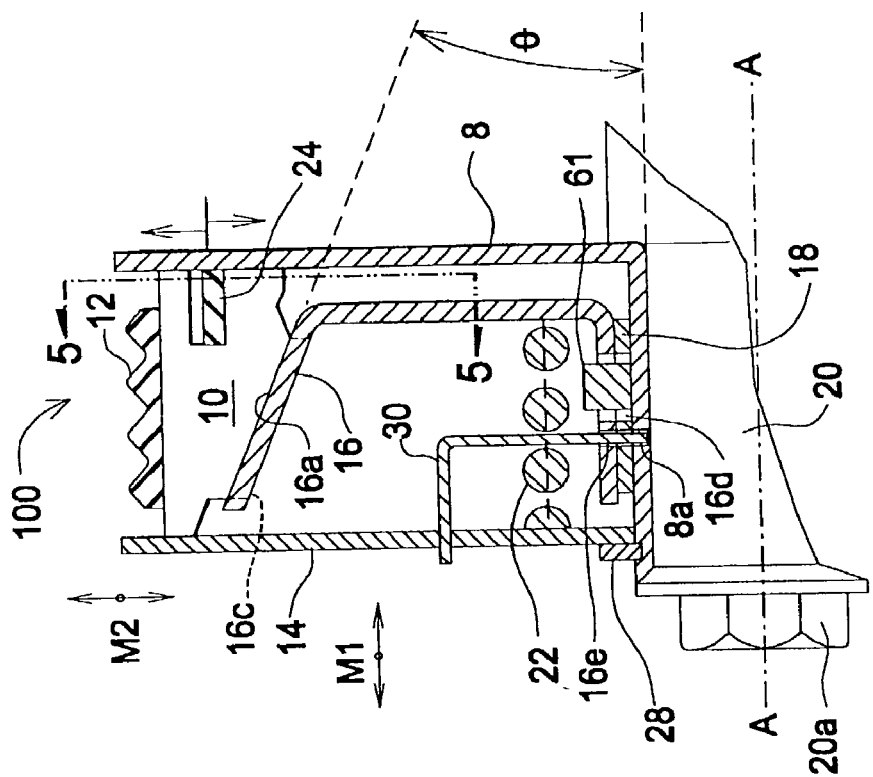
FIG. 3 is a cross-sectional view of the pulley attached to a driven shaft.

FIG. 3 is a cross-sectional view of the pulley attached to a driven shaft. Pulley 100 is attached to a shaft 20 by a bolt 20a. Pulley 100 comprises a plurality of blocks 10 arranged in a circle about shaft 20. Blocks 10 are radially moveable between pulley side 8 and pulley side 14. Snap ring 28 attaches side 14 to side 8. Side 8 and side 14 are connected to shaft 20 and each extend substantially radially with respect to a shaft axis of rotation A—A.

Conical member 16 is axially moveable parallel to an axis of rotation A—A, guided in such movement by a pin 61. Pin 61 extends through a slot 16d in conical member 16.

Each block 10 bears upon and is engaged with member 16 through slot 16c. Such engagement allows a torque to be transmitted from a belt to each block, and thereby to conical member 16. Engagement of conical member 16 with pin 61 allows transmission of torque to the shaft 20. Each pulley 100 may comprise one or more pins 61, or equivalents, engaged with conical member 16 to transmit torque and to guide an axial movement of conical member 16.

Blocks 10 are also slideably engaged with normally extending side 8 and side 14, in addition to slots 16c in conical member 16. Surface 16a of conical member 16 describes an angle θ with an axis of rotation A—A. As conical member 16 is urged by spring 22 along axis A—A in direction M1, each belt block 10 moves radially in direction M2. Angle θ determines the amount of radial movement for the blocks for a given axial movement of conical member 16 in direction M1. Angle θ is selected as needed to achieve a desired radial movement of blocks 10.

Spring or biasing member 22 bears upon side 14 urging conical member 16 axially toward side 8. Spring 22 comprises a coil spring, but may also comprise a Belleville spring, or other form of spring suitable for this application as is known in the art. Pressure from conical member 16 urges the belt blocks radially outward to create a belt tension.

A belt tension is determined by the force of conical member 16, which is a function of the spring rate (k) of spring 22. The amount of force with which the blocks are urged outward determines a belt tension in the system. As such, a spring rate for spring 22 is selected based upon the desired belt tension. A relatively higher spring rate will result in a commensurately greater belt tension. A relatively lower spring rate will result in a commensurately lesser belt tension.

Nested coil springs in parallel, or Belleville springs may be used to achieve a required spring rate as well. An exemplary spring rate (k) is approximately 50N/mm.

The spring rate for springs in parallel is:

$$K_t = k1 + k2 + k3$$

Where:
$K_t$ is a total spring rate; and
k1 and k2 and k3 are spring rates for each spring used in parallel.

Although the force exerted upon the blocks, i.e. the belt tension, is a function of the spring rate, a relative lengthening of the belt and thereby movement of the blocks in most systems is relatively small so no significant change is realized on the belt tension over the operating range. As a result, the inventive pulley allows a belt tension to remain relatively constant for a given change in length of a belt during an operating life.

During initial installation of a belt, conical member 16 is temporarily pinned in a predetermined position using pin 30 wherein spring 22 is maximally compressed. A belt is then trained about the drive system pulleys, including pulley 100. Once the belt is in place pin 30 is removed, thereby releasing spring 22 to act upon conical member 16 and thereby urge belt blocks 10 outward to tension a belt. A low friction bushing 18 allows conical member 16 to freely slide in direction M1. A back side of belt 12 is shown engaged with blocks 10. As such, the pulley is shown as a back-side idler in this figure.

An elastic member 24 is engaged with each block, thereby keeping each engaged with conical member 16 during the portion of pulley rotation where each block is not engaged with a belt.

Figure 4:
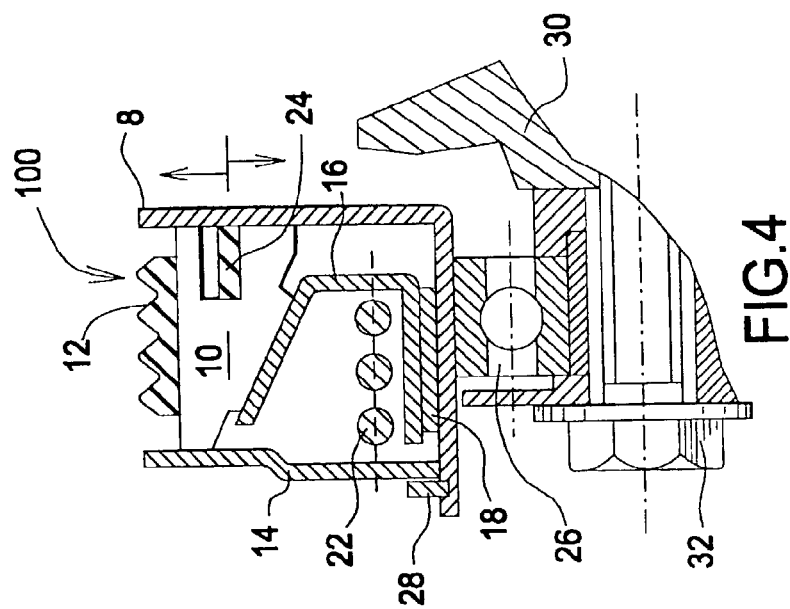
FIG. 4 is a cross-sectional view of the pulley used as an idler.

FIG. 4 is a cross-sectional view of the pulley used as an idler. In this alternate embodiment, pulley 100 is as described in FIG. 3, with the exception that pulley 100 is rotatably mounted to a surface 30 by bolt 32. A bearing 26 allows free rotation of the pulley about bolt 32, as opposed to a driven shaft in FIG. 3. In this configuration the pulley is used as an idler, for example, as shown in place of idler 7 in FIG. 1. More particularly, this idler embodiment may be used to take the place of idler 7 in FIG. 1 while providing the advantageous belt tensioning and belt length compensating function. Belt 12 is shown engaged with the blocks 10 in a back-side orientation.

FIG. 5 is a cross-sectional view at line 5—5 in FIG. 3. Elastic member 24 is shown engaged with a plurality of blocks 10. Elastic member 24 has a resilient, elastic characteristic which allows it to resist a centripetal force exerted on the blocks during rotation. However, a spring rate of the elastic member is not sufficiently large so as to completely counter a force exerted by spring 22 on member 16, and thereby prevent member 16 from moving as needed to allow each block to move radially in order to compensate for a belt length increase. Each block 10 slides in a respective slot 16c as conical member 16 moves axially.

Figure 6:
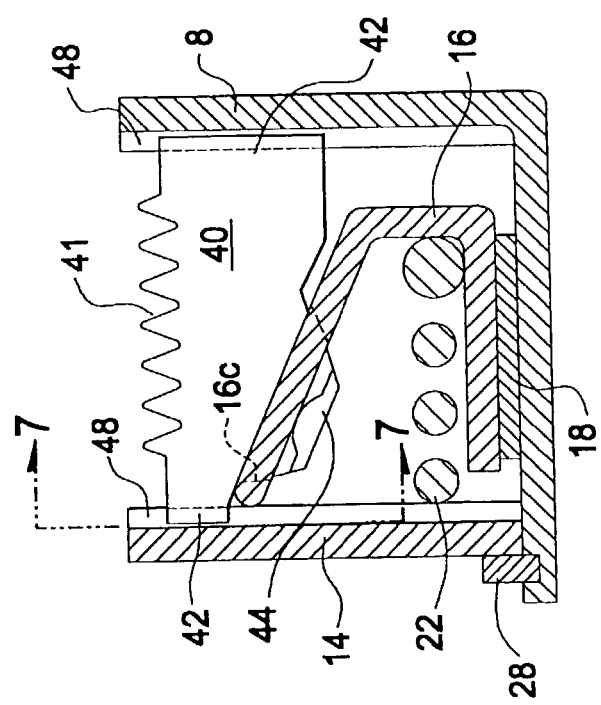
FIG. 6 is a cross-sectional view of an alternate embodiment of the pulley.

FIG. 6 is a cross-sectional view of an alternate embodiment of the pulley. In this alternate embodiment, ends 42 of belt blocks 40 are engaged with radial slots 48 in side 8 and side 14. Ends 42 may be externally lubricated, for example with oil or graphite, or may have a low friction surface or have an internal lubricant impregnated in the block itself. Each radially extending slot may be externally lubricated, for example with oil or graphite, or may have a low friction surface or have a lubricant impregnated in the material describing the slot itself.

Elastic member 24 is not used in this embodiment. Instead, each tab or engagement member 44 forms an "L" shape on the base of each block 40 which slidingly engages with a corresponding slot 16c in conical member 16. Tab 44 mechanically keeps each block 40 engaged with conical member 16 against centripetal forces to maintain a proper circular arrangement of the blocks during operation. As conical member 16 moves axially parallel to axis A—A as described herein, each of the blocks moves radially to determine a pulley diameter and thereby a belt tension, and to compensate for a belt length change.

A torque is transmitted from a belt to the shaft by engagement of each block 10 with a slots 48. Sides 8 and 14 are connected to a shaft. Pin 61 is not required in this embodiment, but may be used to augment transmission of torque if necessary.

In yet another alternate embodiment, each block 10 is shown with a multi-ribbed belt engaging surface 41. Blocks 10 may have a flat profile for engaging a belt as shown in FIG. 3 or a multi-ribbed profile as shown in FIG. 6.

Figure 7:
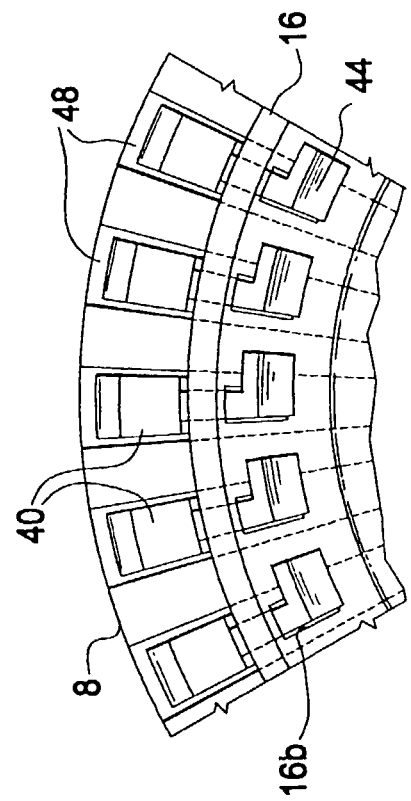
FIG. 7 is a detail of FIG. 6 at line 7—7.

FIG. 7 is a detail of FIG. 6 at line 7—7. Each radially extending slot 48 on side 8 engages an end 42 of each block 40. Tabs 44 mechanically and slidingly engage block 40 with conical member 16.

Figure 8:
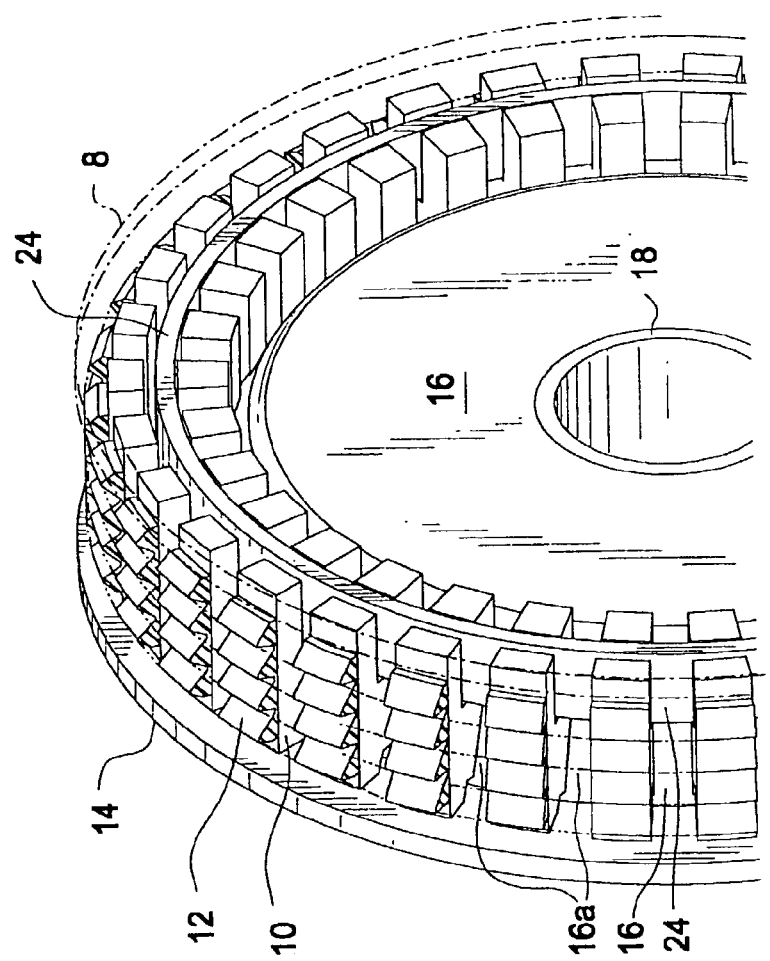
FIG. 8 is a cut-away perspective view of a pulley.

FIG. 8 is a cut-away perspective view of a pulley. Blocks 10 are shown circumferentially arranged about conical member 16. Belt 12 is shown in a back side orientation. Elastic member 24 holds blocks 10 in contact with conical member 16.

Figure 9:
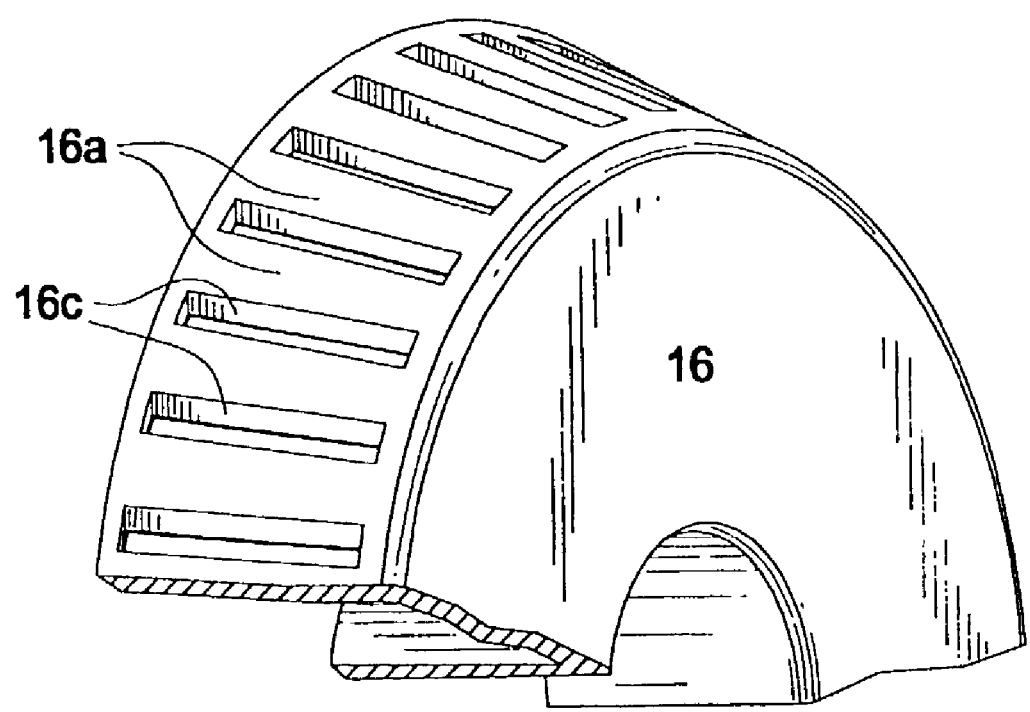
FIG. 9 is a perspective view of the conical member.

FIG. 9 is a perspective view of the conical member. Conical member 16 comprises slots 16c disposed on surface 16a. Slots 16c are disposed substantially parallel to a centerline A—A.

Although a single form of the invention has been described herein, it will be obvious to those skilled in the art that variations may be made in the construction and relation of parts without departing from the spirit and scope of the invention described herein.

I claim:
1. An expandable pulley comprising:
a radial surface extending normally with respect to an axis A—A;
a conical surface moveable relative to the radail surface;
a plurality of blocks arranged in a substantially circular form, a block first surface slidingly engaged with the radial surface and a block second surface slidingly engaged with the conical surface;
an elastic member engaged with each block whereby each block is held in contact with the conical surface; and
a single spring member co-axial with axis A—A axially urging the conical member whereby each block is radially moveable upon an axial movement of the conical member.

2. The pulley as in claim 1, wherein each block further comprises a belt engaging surface.

3. The pulley as in claim 1, further comprising a second radial surface disposed substantially parallel to the radial surface and each block being engagable with said second radial surface.

4. The pulley as in claim 1 further comprising;

a bearing; and the bearing engagable with a fastener whereby the pulley rotates about the fastener.

5. An expandable pulley comprising:

a radially extending surface;

a conical surface moveable relative to the radially extending surface;

a plurality of blocks arranged in a substantially circular form, a block first surface slidingly engaged with the radially extending surface and a block second surface slidingly engaged with the conical surface;

a single biasing member co-axial with axis A—A axially urging the conical member whereby each block is radially moveable upon an axial movement of the conical member; and a removable member for temporarily retaining the conical surface in a predetermined position with respect to the radially extending surface.

6. The expandable pulley as in claim 5 further comprising;

an elastic member engaged with each block whereby each block is held in contact with the conical surface.

* * * * *